(12) United States Patent
Berkan et al.

(10) Patent No.: US 7,739,104 B2
(45) Date of Patent: Jun. 15, 2010

(54) SYSTEM AND METHOD FOR NATURAL LANGUAGE PROCESSING AND USING ONTOLOGICAL SEARCHES

(75) Inventors: Riza C. Berkan, New York, NY (US); Victor Raskin, West Lafayette, IN (US)

(73) Assignee: hakia, Inc., New York, NY (US)

(*) Notice: Subject to any disclaimer, the term of this patent is extended or adjusted under 35 U.S.C. 154(b) by 558 days.

(21) Appl. No.: 11/443,898

(22) Filed: May 30, 2006

(65) Prior Publication Data

US 2006/0271353 A1    Nov. 30, 2006

Related U.S. Application Data

(60) Provisional application No. 60/685,060, filed on May 27, 2005.

(51) Int. Cl.
*G06F 17/27* (2006.01)

(52) U.S. Cl. ..................... 704/9; 704/7; 704/4

(58) Field of Classification Search ........... 707/1–3, 707/5, 7, 4, 102; 704/1–10, 251, 257, 270
See application file for complete search history.

(56) References Cited

U.S. PATENT DOCUMENTS

| 5,794,050 | A | 8/1998 | Dahlgren et al. | |
|---|---|---|---|---|
| 6,510,406 | B1 | 1/2003 | Marchisio | |
| 6,675,159 | B1 * | 1/2004 | Lin et al. | 707/3 |
| 6,766,316 | B2 | 7/2004 | Caudill et al. | |
| 6,775,666 | B1 * | 8/2004 | Stumpf et al. | 707/5 |
| 6,910,003 | B1 | 6/2005 | Arnold et al. | |
| 7,027,974 | B1 | 4/2006 | Busch et al. | |
| 7,260,573 | B1 * | 8/2007 | Jeh et al. | 707/7 |
| 7,296,011 | B2 * | 11/2007 | Chaudhuri et al. | 707/3 |
| 7,403,938 | B2 * | 7/2008 | Harrison et al. | 707/3 |
| 2002/0059289 | A1 | 5/2002 | Wenegrat et al. | |
| 2002/0147578 | A1 | 10/2002 | O'Neil et al. | |
| 2004/0103090 | A1 | 5/2004 | Dogl et al. | |
| 2005/0125400 | A1 | 6/2005 | Mori et al. | |

FOREIGN PATENT DOCUMENTS

WO    WO-02/35376 A2    5/2002

OTHER PUBLICATIONS

USPTO's East search system (result of a test search is provided).*

* cited by examiner

*Primary Examiner*—Huyen X. Vo
(74) *Attorney, Agent, or Firm*—Dickstein, Shapiro, LLP.

(57) ABSTRACT

A search engine is disclosed that utilizes natural language processing (NLP) techniques. The search engine utilizes meaning-based natural language processing using ontological semantics in analyzing the meaning of queries and the searched text. This system analyzes Web pages and queries. The NLP method produces equivalent meanings to a sequence of user initiated words, wherein relevance parsing of the original query produces a display of queries/questions as hot links to the next round of searching without additional typing by the user.

3 Claims, 4 Drawing Sheets

Fig. 2

SYSTEM AND METHOD FOR NATURAL LANGUAGE PROCESSING AND USING ONTOLOGICAL SEARCHES

CROSS-REFERENCE TO RELATED CASES

This application claims priority to U.S. Provisional Application No. 60/685,060, filed May 27, 2005, the entirety of which is incorporated herein by reference.

BACKGROUND OF THE INVENTION

U.S. Pat. No. 5,794,050 to Dahlgren et al. provides for a Natural Language Understanding System. A naive semantic system that incorporates modules for text processing based upon parsing, formal semantics and discourse coherence, as well as relying on a naive semantic lexicon that stores word meanings in terms of a hierarchical semantic network is disclosed. Naive semantics is used to reduce the decision spaces of the other components of the natural language understanding system of. According to Dahlgren, naive semantics is used at every structure building step to avoid combinatorial explosion.

For example, the sentence "face places with arms down" has many available syntactic parses. The word "face" could be either a noun or a verb, as could the word places". However, by determining that "with arms down" is statistically most likely to be a prepositional phrase that attaches to a verb, the possibility that both words are nouns can be eliminated. Furthermore, the noun sense of "face" is eliminated by the fact that "with arms down" includes the concepts of position and body, and one sense of the verb "face" matches that conception. In addition to the naive semantic lexicon, a formal semantics module is incorporated, which permits sentences to be evaluated for truth conditions with respect to a model built by the coherence module. Coherence permits the resolution of causality, exemplification, goal, and enablement relationships. This is similar to the normal functionality of knowledge bases.

Natural language retrieval is performed by Dahlgren's system using a two-stage process referred to as digestion and search. In the digestion process, textual information is input into the natural language understanding module, and the NLU module generates a cognitive model of the input text. In other words, a query in natural language is parsed into the representation format of first-order logic and the previously described native semantics. The cognitive model is then passed to a search engine, that uses two passes: a high recall statistical retrieval module using unspecified statistical techniques to produce a long list of candidate documents; and a relevance reasoning module which uses first-order theorem proving, and human-like reasoning to determine which documents should be presented to the user. Generally, Dahlgren analyzes text based on sentence structure. The sentence is analyzed using a word-by-word analysis and a whole sentence analysis. Disclosed is a method for interpreting natural language input, wherein parsing and a naive semantic lexicon are utilized in conjunction to determine the plausibility of interpretative decisions, and wherein at least one entry identifying at least one sense of a word may be related to an ontological classification network, syntactic information, and a plurality of semantic properties.

Dahlgren system uses a semantic network similar to the ontologies employed in the system of present invention. However, it relies on a complicated grammatical system for the generation of formal structures, where complicated grammatical information is needed to eliminate possible choices in the parser. The concept based search engine system of the present invention provides an advantage in that it uses a simple grammatical system in which rule probabilities and conflicting ontological descriptions are used to resolve the possible syntactic parses of sentences. This greatly reduces the processing power required to index documents.

U.S. Pat. No. 6,675,159 to Lin et al. provides for a Concept-Based Search and Retrieval System. Disclosed is a concept-based method for searching text documents, wherein the method provides transforming a natural language query into predicate structures representing logical relationships between words in the natural language query; an ontology containing lexical semantic information about words; and means for ranking a set of matching natural language query predicate structures and equivalent text document predicate structures.

Lin's system imposes a logical structure on text, and a semantic representation is the form used for storage. The system provides logical representations for all of the content in a document and a semantic representation of comparable utility with significantly reduced processing requirements, and no need to train the system to produce semantic representations of text content. While training is needed to enable document categorization in the system, generation of the semantic representation is independent of the categorization algorithm.

U.S. Pat. No. 6,766,316 to Caudill et al. assigned to Science Application International Corporation, provides for a Method and System of Ranking and Clustering for Document Indexing and Retrieval. Disclosed is a relevancy ranking/clustering method and system for an information retrieval system which ranks documents based on relevance to a query and in accordance with user feedback. Additionally, a question and answering system further provides an answer formulation unit providing a natural language response to the input query.

U.S. Pat. No. 6,910,003 to Arnold, assigned to Discern Communications, Inc., discloses system and method for searching. Raw text is retrieved or input into the system. The raw text is parsed into components such as date, place, location, actors, and the like. The raw text is stored in topic specific information caches based on the individual components. In operation, a user enters a query. The system parses the user query and compares the parsed query to the topic specific information caches. Matching topic specific information caches are displayed to the user.

U.S. Patent Publication No. 2002/0059289 to Wenegrat et al. provides for Methods and Systems for Generating and Searching a Cross-Linked Keyphrase Ontology Database. Disclosed is a method of generating a cross-linked key-phrase ontology database, wherein the cross-linked key-phrase ontology database may be searched by parsing a natural language statement into a structured representation. The methods and systems of the invention involve the generation and use of a cross-linked keyphrase ontology database. A cross-linked keyphrase ontology database is created by: (a) defining at least one keyphrase; (b) representing the keyphrase by a keyphrase node in an ontology; (c) cross-linking the keyphrase node to at least one second keyphrase node, where the second keyphrase node represents a second keyphrase in a second ontology; and (d) repeating steps (b)-(c) for each keyphrase defined in step (a). The keyphrase in step (a) may be generated by parsing a text and can be selected from a group consisting of nouns, adjectives, verbs and adverbs. In one embodiment, the keyphrase in step (a) and the second keyphrase have at least one word in common. The text parsed may be in English or in any other written or spoken language U.S. Patent Publication No. 2004/0103090 to Dogl et al. provides for a Document Search and Analyzing Method and Apparatus. Disclosed is a document search system having an ontology indexing function (ontology indexer 113), wherein search engine sub-system 125, in conjunction with indexer 113 and concept search engine 126, provides means for processing/parsing search queries to create a new entry for each word in a word index, and then associates it with a unique word ID, thereby allowing result builder 222 to create a two dimensional or three-dimensional graphical representation of the query data set or ontology (visualization model).

U.S. Patent Publication No. 2005/0125400 to Mori et al. provides for an Information Search System, Information Search Supporting System, and Method and Program for Information Search. Disclosed is an information search system having conversion means for decomposing a natural language sentence according to a dependence relationship between single words of the natural language and a corresponding ontology as means for generating an inquiry sentence.

Foreign patent WO/0235376 to Busch et al. provides for an Ontology-Based Parser for Natural Language Processing. Disclosed is a system and method for converting natural-language text into predicate-argument format by utilizing an ontology-based parser, wherein a sentence lexer may be utilized to convert a sentence into ontological entities tagged with part-of speech information.

U.S. Patent Publication No. 2002/0147578 to O'Neil et al., assigned to LingoMotors, Inc., provides for a Method and System for Query Reformulation for Searching of Information. Disclosed is a method for searching information using a reformulated query expression where a user inputs a query. The query is generally in a natural language form. The query is indicated as an input query. The input query is provided into an engine 103 to convert the natural language form into a logical form. The logical form is preferably one that has semantic information provided into the logical form. The logical form also has key terms of the query, among other information and is used for the query.

SUMMARY OF THE INVENTION

Disclosed is a system and method for searching. In particular, a search engine is disclosed that utilizes natural language processing (NLP) techniques. In particular, the search engine utilizes meaning-based natural language processing as well as ontological semantics in analyzing the meaning of queries as well as the text of the searched web pages, documents or the like. This system is used to analyze Web pages, queries, and the like.

Query analysis is a commonly encountered term in the search engine literature. It mainly refers to parsing the query using a tokenizer, eliminating insignificant words (such as "the"), and in some cases finding the plural form of the words. A complete morphological variation (such as "take" "took" "taking") is rarely deployed because these findings cannot be easily used in a single Boolean operation over an inverted index unless single query request is transformed into multiple requests by the system and the results are aggregated somehow. This has not been a common practice today. Also, some search engines claiming Natural Language Processing (NLP) capability only analyze the question (not the text) in the manner described above to convert natural queries into a stream of keywords which is a misprestentation of the general idea of NLP. Outside the search engine domain, query analysis for the generic act of retrieval, mostly for document management type applications, can be more involved.

In particular, a search engine is disclosed that utilizes natural language processing (NLP) techniques. The search engine utilizes meaning-based natural language processing using ontological semantics in analyzing the meaning of queries and the searched text. This system analyzes Web pages, queries, and the like. The natural language processing method produces equivalent meanings to a sequence of user initiated words, wherein relevance parsing of the original query produces a display of queries/questions as hot links to the next round of searching without additional typing by the user.

The system receives text as an input. The text is processed using one or more of various resources including a language specific dictionary, fact databases, inference rules, a word index, text meaning representations, word development, i.e., ontology, and the like. The text is related to other terms using the resources to include other terms and phrases. These expanded terms are used for a more thorough search of available data.

The ontological semantics process and system deploys a designated function per request type that optimizes its speed and makes it feasible in time-constrained applications such as in a search engine. All the words in a sequence of words that correspond to an anticipated query are analyzed by ontological semantics process to identify each word's parent. Words that produce a parent through ontological semantics are used to create new sequences (called inherited sequences).

BRIEF DESCRIPTION OF THE DRAWINGS

FIG. 2 depicts a result screen according to one embodiment of the invention;

DETAILED DESCRIPTION OF THE INVENTION

Disclosed is a system for performing searches using Natural Language Processing and Ontological Semantics. The search terms are input into the system and processed according to rules. The individual search terms are analyzed and divided by language type such as question, noun, verb, adjective, punctuation, and the like. Tags identifying each term type are preferably associated with each term. Additionally, the terms are expanded using ontological semantic to expand the scope of the search terms.

Figure 1:
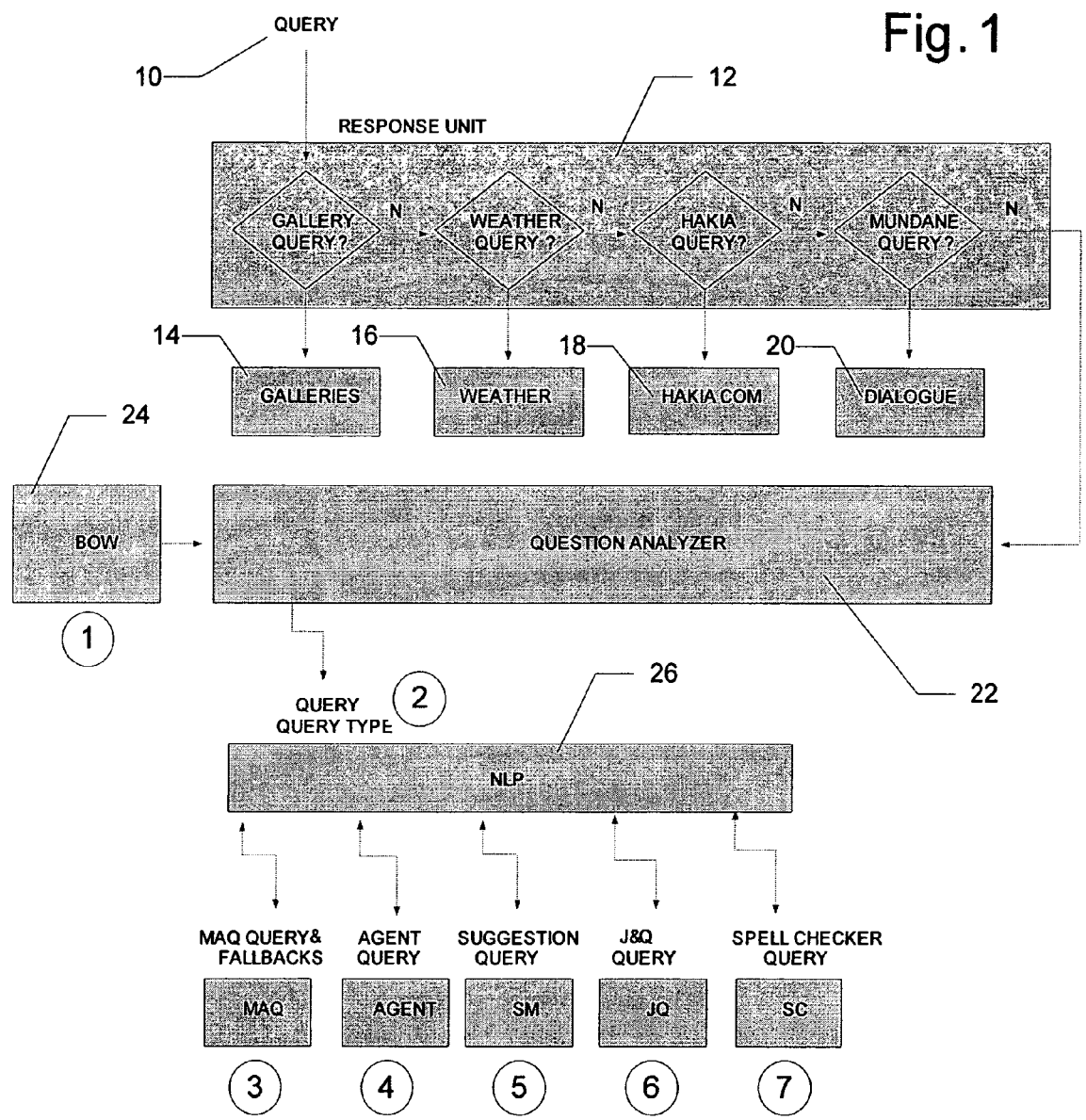
FIG. 1 depicts how a query is processed according to one embodiment of the invention.

In operation, a query 10 is input into a response unit 12, as shown in FIG. 1. As discussed herein, the query 10 is "what drug treats headache?" In a preferred embodiment, the response unit 12 is adapted to sift the incoming query 10 for already analyzed queries. For example, if a gallery has already been created from incoming query 10, the query is sent to the gallery unit 14 for processing and the results are retrieved from the Gallery database.

Likewise, if the query is a weather query, the weather module 16 processes it and the results are retrieved from a Weather database. Likewise, if the query is a query about hakia, the database 18 processes it and the results are retrieved from an hakia database. Likewise, if the query is a mundane query, the dialogue database 20 processes it and the results are retrieved from a dialogue database. Out of billions of possible queries that can be asked to a search engine, only a small fraction of them are treated via databases 14, 16, 18, and 20. The selection of which database to go is made using a list of pre-defined search terms for each database (14, 16, 18, 20) based on exact match. This list resides inside response unit. If the response unit 12 does not process the query (i.e., it could not send to any one of the databases 14, 16, 18, 20), it is sent to a Question Analyzer (QA) module 22. In one embodiment, every query is input into the QA module. The QA module 22 calls a Tokenizer (TK) to separate the query into word groups and sentence groups by specific rules. The QA module 22 calls the Bag-of-Words (BOW) library 24 to identify these word tags per definitions. As the result of the data processing, the QA module 22 identifies the query type based on its rules of detection. The processing of the preferred embodiment is shown in Table 1.

TABLE 1

|  |  | String | Word Type | Tag | Morphological variations | Query Type |
|---|---|---|---|---|---|---|
| Word | 1 | What | question word | Q1 |  | Q1 |
| Word | 2 | drug | noun | N1 | drugs |  |
| Word | 3 | treats | verb | V1 | treat, treating, treated |  |
| Word | 4 | headache | noun | N1 | headaches |  |
| Word | 5 | ? | Quotation mark | Z1 |  |  |

The QA module 22 sends the information shown in table 1 to a Natural Language Processor (NLP) module 26. The NLP module 26 creates a retrieval sequence. In a preferred embodiment, the retrieval request is called a Mapped Anticipated Query Request (MAQ request). In the present example, the MAQ request is "drug headache treat". This sequence will be used to retrieve paragraphs from a paragraph data storage system. In one embodiment, an uneven triple-redundant storage system is used. However, it should be noted that other storage systems can be used. In one embodiment, sequences are created using alphabetical sorting.

The NLP module 26 also creates "fallback sequences" 28. This is called a "fallback request". The fallback requests include "drug headache", "drug treat", and "headache treat". These sequences are used to retrieve paragraphs from the paragraph storage system preferably when there is no response back from the paragraph storage system storage for the complete sequence. Fallback sequences 28 are created using special rules that take into account the word tags and their weights. The NLP module 26 prepares a MAQ request set by attaching file name extensions, for example, "drug headache treat.inx". The NLP module 26 uses the sequences above to identify the location IDs of the MAQ files in the paragraph storage system using a hash+mode method. In one embodiment, the MAQ request is ID1, and the fallback requests are sequentially labeled ID2, ID3, and the like.

The NLP module 26 calls a "MAQ Retrieval and Scooping" (MRS) module to retrieve MAQ files from KUTS using the IDs. If the first MAQ request containing the fully query sequence brings a MAQ file with enough results, then the fallback requests are omitted. The required number of results is determined based on the topic of the query, number of words in the query, and the like. The MRS method opens the MAQ file(s) and collects paragraph IDs (PIDs) using the MAQ sequence and the original query. A typical MAQ file has the following structure:

File name: drug headache treat.inx

Paragraph PID-1 Scores of (PID-1) Equivalent Words (drug=Paracetamol, treat=relieve)

Paragraph PID-2 Scores of (PID-2) Equivalent Words (headache=migraine, treat=heal)

The list inside a MAQ file is preferably a predefined length. In a first embodiment, the MAQ file is 100 entries long. In another embodiment, the list is not limited and contains all possible matching results. The MAQ files are preferably created during an off-line process where Ontological Semantics identify equivalences, and the MAQ generator identifies the MAQ file names (from the sequences that occur in the paragraphs of the analyzed text).

The MRS method retrieves the paragraphs from KUTS using the paragraph PIDs. Along with each paragraph, its URL and Title are also retrieved. MRS then transfers this set of paragraphs back to the NLP module 26. A typical paragraph is shown below.

Paracetamol is Called Acetaminophen in the United States

By reducing the amount of prostaglandin available for synthesis, paracetamol helps relieve headache pain by reducing the dilation of the blood vessels that cause the pain.

Paracetamol, however, only inhibits prostaglandin biosynthesis in the central nervous system (CNS). Paracetamol has little or no effect on peripheral tissues.

http://www.painhelp.com/info/paracetamol/

The NLP module 26 analyzes each paragraph, and each sentence one at a time. The NLP module 26 calls the TK module to parse out the words. The NLP module 26 uses NLP-Elastic Scoring and NLP-Special Solutions, with the word equivalences, to assign each sentence a relevancy score with respect to the original query. A typical scoring process selects the best sentence in the paragraph.

A typical scoring report for the above paragraph is shown below. The score reflects the analysis performed with respect to the query.

| Overall Score: | 0.7591516 | Title Score: | 0 |
|---|---|---|---|
| Sentence Score: | 0.9364396 | Domain | 0 |
| Source: | 0 | Score: |  |
| Sp: | 1 | Link Score: | 0 |
| St (Pairs): |  |  |  |
| A:B:0.41 * 0.75 * 1.0 = 0.3075 |  |  |  |
| A:C:1 * 0.75 * 1.0 = 0.75 |  |  |  |
| B:C:0.41 * 1 * 1.0 = 0.41 |  |  |  |
| Extra Modifier (Em): | 1 |  |  |
| Ss = (Sp * (1−)1 − St/Sw/k(M)) + (0.001 * Sx)) * Em |  |  |  |

The best sentence in every paragraph is preferably highlighted, underlined, italicized, or bolded for visual effect of distinction when the results displayed on the screen. In a preferred embodiment, the relevant portion is highlighted in yellow. The overall score of each paragraph decides the order of display of the paragraphs, from top to bottom.

Figure 2:
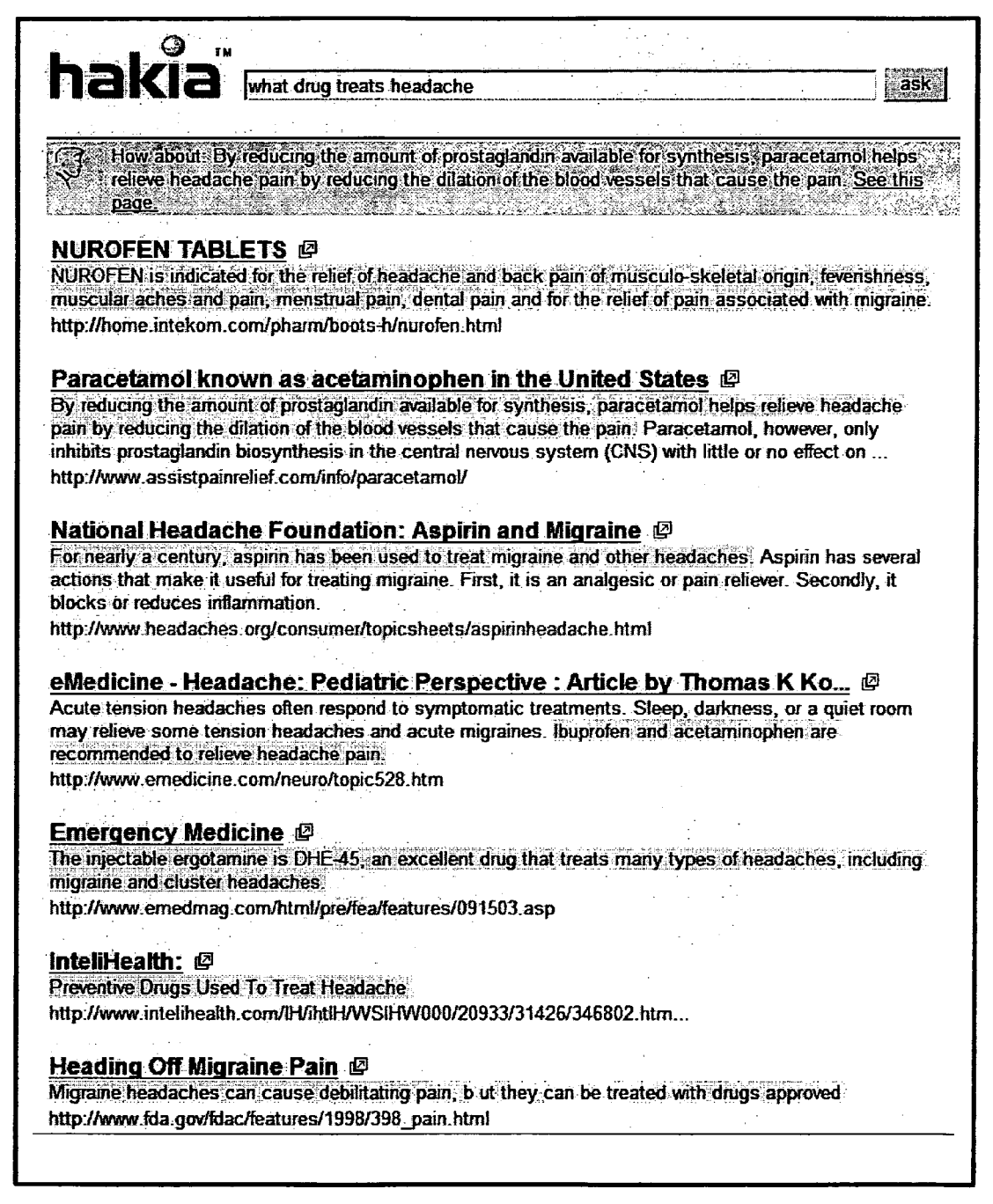

After all the paragraphs are analyzed and best sentences are identified, one of the best sentences is selected to be sent to dialogue module (20). This selection is done using special rules. The dialogue module displays the selected sentence at the top of the screen. In front of the selected sentence for dialogue, additional comments are added from the contents of the file HEDGES.txt. These comments include short expressions like "good question", "consider this", and the like. The results are compiled and sent to the display unit to produce a result screen as shown in FIG. 2.

The MAQ files are stored in the paragraph storage system. The MAQ files aid system performance. In one embodiment, the MAQ file system can be replaced by some other database or indexed using on-the-fly analysis.

As discussed above, every query is analyzed and reformulated. FIG. 1 shows the distribution, reformulation, and check procedure (in the order of execution), where the QA process operates among other modules. The QA module 22 operates on queries after they are processed in the response unit 12.

QA module 22 operates in conjunction with a bag of words module BOW 24. For the BOW to function, each part of text is processed. For a given language, for example English, BOW Tags are defined by calling the BOW object. The QA module 22 prepares the query for the natural language processor (NLP) 26.

At the outset, the type of the query is determined for the NLP module 26. The query type is either a what, how, why, who, where, or the like. In a preferred embodiment, the queries are processed according to the following rules.

The first 19 examples presented below represent questions that use what to ask the question.

Type=Q1

What is a honey bee?

IF

| $1^{st}$ word is | $2^{nd}$ word is | $3^{rd}$ word is | $4^{th}$ word is | $5^{th}$ word is | $6^{th}$ word is |
|---|---|---|---|---|---|
| What | is<br>are | anything<br>→ | | | |

Type=Q2

What was the most watched TV series at all times?

What was the most expensive TV series production in history?

IF

| $1^{st}$ word is | $2^{nd}$ word is | $3^{rd}$ word is | $4^{th}$ word is | $5^{th}$ word is | $6^{th}$ word is |
|---|---|---|---|---|---|
| What | is<br>are<br>was<br>were | the | most<br>least<br>best<br>worst | [V1]/QT002 | anything |

Type=Q3

What is the meaning of life?

What are the symptoms of diarrhea?

What is the length of the San Francisco Bridge?

IF

| $1^{st}$ word is | $2^{nd}$ word is | $3^{rd}$ word is | $4^{th}$ word is | $5^{th}$ word is | $6^{th}$ word is |
|---|---|---|---|---|---|
| What | is<br>are<br>was<br>were | the | (X)T003 | of | anything |

Type=Q4

What opera singer was the best performing artist in last nights concert?

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| What<br>Which | Comb of 2 words here [N1] [SM] [A1] Or a single word | is<br>are<br>was<br>were | the | most<br>least<br>best<br>worst | anything<br>→ | |

Type=Q5

Which baseball player was smiling during the opening gala of . . .

Which car speeds up to 60 miles an hour in 5 seconds?

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| What<br>Which | Comb of 2 words here [N1] [SM] [A1] Or a single word | is/are<br>was/were<br>do/does<br>did/has/have<br>[V*] | anything<br>→ | | | |

Type=Q6

What causes concrete to crack?

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| What<br>Which | [V*] | anything<br>→ | | | | |

Type=Q7

What sort of maniac drives BMW motorbike in a school building?

IF

| 1st word is | 2nd word is | 3rd word is | 4th word is | 5th word is | 6th word is | 7th word is |
|---|---|---|---|---|---|---|
| What<br>Which | kind<br>sort<br>type<br>class | of | anything → | | | |

Type=Q8

What time does the Orioles game start?

IF

| 1st word is | 2nd word is | 3rd word is | 4th word is | 5th word is | 6th word is | 7th word is |
|---|---|---|---|---|---|---|
| What<br>Which | time<br>date | anything → | | | | |

Type=Q9

What medicine is best for sleep deprivation?

IF

| 1st word is | 2nd word is | 3rd word is | 4th word is | 5th word is | 6th word is | 7th word is |
|---|---|---|---|---|---|---|
| What<br>Which | Comb of 2 words here [N1] [SM] [A1] Or a single word | is<br>are<br>was<br>were | most<br>least<br>best<br>worst | for | known for → | anything |

Type=Q10

What should I do if my dog eats chocolate?

IF

| 1st word is | 2nd word is | 3rd word is | 4th word is | 5th word is | 6th word is | 7th word is |
|---|---|---|---|---|---|---|
| What | should | I<br>you<br>one | do | anything → | | |

Type=Q12

What are the signs of trouble?

IF

| 1st word is | 2nd word is | 3rd word is | 4th word is | 5th word is | 6th word is | 7th word is |
|---|---|---|---|---|---|---|
| What | are<br>were | the | anything → | | | |

Type=Q19

IF

| 1st word is | 2nd word is | 3rd word is | 4th word is | 5th word is | 6th word is | 7th word is |
|---|---|---|---|---|---|---|
| What<br>Which | Anything → | | | | | |

The next nine questions ask questions using the term how.

Type=Q20

How to make lasagna?

IF

| 1st word is | 2nd word is | 3rd word is | 4th word is | 5th word is | 6th word is | 7th word is |
|---|---|---|---|---|---|---|
| How | to | [V1] | anything → | | | |

Type=Q21

(How) [high/often/frequent] can a bear jump in the air?

(How) [fast] do birds fly?

IF

| 1st word is | 2nd word is | 3rd word is | 4th word is | 5th word is | 6th word is | 7th word is |
|---|---|---|---|---|---|---|
| How | QT021 | is/are<br>was/were<br>can/may<br>should/must<br>do/does<br>has/have<br>had/did | anything → | | | |

Type=Q22

(How much) (does) [a bee] [weigh]?

How much does a Mustang cost?

IF

| 1st word is | 2nd word is | 3rd word is | 4th word is | 5th word is | 6th word is | 7th word is |
|---|---|---|---|---|---|---|
| How | much | does do | it/a/[SM]/ [N1]/ [PR]/[OO] combination of up to 3 words | QT022 | anything → | |

Type=Q23
    (How much) [a bee] [weighs]?
    How much a Mustang costs?

IF

| 1st word is | 2nd word is | 3rd word is | 4th word is | 5th word is | 6th word is | 7th word is |
|---|---|---|---|---|---|---|
| How | much | a/ [SM]/[N1]/ [PR]/[OO] combination of up to 3 words | QT022 | anything → | | |

Type=Q24
    (How many) [tall] [bodyguards] (does) [the President] [have]?
    (How many) [countries] [are] [in the United Nations]?

IF

| 1st word is | 2nd word is | 3rd word is | 4th word is | 5th word is | 6th word is | 7th word is |
|---|---|---|---|---|---|---|
| How | many | [SM]/[N1]/ [PR]/[P2]/ [OO]/[A1]/ [V3] combination of up to 3 words | anything → | | | |

Type=Q25
    (How many times) did Tyson lose a fight?

IF

| 1st word is | 2nd word is | 3rd word is | 4th word is | 5th word is | 6th word is | 7th word is |
|---|---|---|---|---|---|---|
| How | many | times | anything → | | | |

Type=Q26
    (How) (were) (the) [markets] [yesterday]?
    (How) (is) (the) [situation] [in Iraq]?

IF

| 1st word is | 2nd word is | 3rd word is | 4th word is | 5th word is | 6th word is | 7th word is |
|---|---|---|---|---|---|---|
| How | Is/are Was/were | the | anything → | | | |

Type=Q27
    (How) is pancreatic cancer treated?
    (How) should I know if my prescription is correct?
    (How) (can) [a beautiful] [women] [date] [older man]?

IF

| 1st word is | 2nd word is | 3rd word is | 4th word is | 5th word is | 6th word is | 7th word is |
|---|---|---|---|---|---|---|
| How | Is/are Was/were do/does can/may did should | anything → | | | | |

Type=Q29

IF

| 1st word is | 2nd word is | 3rd word is | 4th word is | 5th word is | 6th word is | 7th word is |
|---|---|---|---|---|---|---|
| How | anything → | | | | | |

The next rule applies to those questions that ask queries using the term why.

Type=Q39
    Why is the sky blue?

IF

| 1st word is | 2nd word is | 3rd word is | 4th word is | 5th word is | 6th word is | 7th word is |
|---|---|---|---|---|---|---|
| Why | anything → | | | | | |

The next rules apply to queries using who.

Type=Q41
    (Who) (is) (the) [king] (of [comedy] [of all times])?
    (Who) (was) (the) [director] (of [12 Samurais])?
    (Who) (is) (the) [builder] (of [Eiffel tower])?
    (Who) (is) (the) [CEO] (of [IBM])?

IF

| 1st word is | 2nd word is | 3rd word is | 4th word is | 5th word is | 6th word is | 7th word is |
|---|---|---|---|---|---|---|
| Who | is/are was/were | the | QT041 | of | anything → | |

Type=Q42

(Who) [manufactures] [wall-mounted] [hair dryers]?

(Who) [killed] [Abraham Lincoln]?

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Who | [V*] | anything → | | | | |

Type=Q43

(Who) (is) (the) [best] (cook) [in] [Manhattan]?

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Who | is/are was/were | the | QT043 | anything → | | |

Type=Q49

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Who | anything → | | | | | |

The next rules apply to questions using when.

Type=Q59

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| When | anything → | | | | | |

Where questions are handled with the following rules.

Type=Q68

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Where | can | I | find | anything → | | |

Type=Q69

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Where | anything → | | | | | |

Confirmation questions or queries are using the following rules.

Type=Q78

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Is | it | true | anything → | | | |

Type=Q79

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Is/are Was/were Do/does/did Has/have/had Shall/will Should/could Would/might May/can | anything → | | | | | |

Many users enter queries that seek information directly. These queries are command queries such as find, fetch, look, and the like.

Type=C1

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| Find Bring Fetch Look | anything → | | | | | |

Type=C2

IF

| $1^{st}$ word is | $2^{nd}$ word is | $3^{rd}$ word is | $4^{th}$ word is | $5^{th}$ word is | $6^{th}$ word is | $7^{th}$ word is |
|---|---|---|---|---|---|---|
| List List-of Table-of | anything → | | | | | |

Type=C3
IF

| | | $3^{rd}$ | $4^{th}$ | $5^{th}$ | $6^{th}$ | $7^{th}$ |
|---|---|---|---|---|---|---|
| $1^{st}$ word is | $2^{nd}$ word is | word is | word is | word is | word is | word is |
| Compare Analyze | anything → | | | | | |

Based on the query analysis, the queries are formulated for the MAQ. A flag is set for each of the queries. For example, "where" questions, apply the flag A (for address), which will automatically include P (for place) in the Retrieval module. For "what time" Q8 questions, apply the flag T (for time). "When" questions also receive the flag T (for time)

Figure 3:
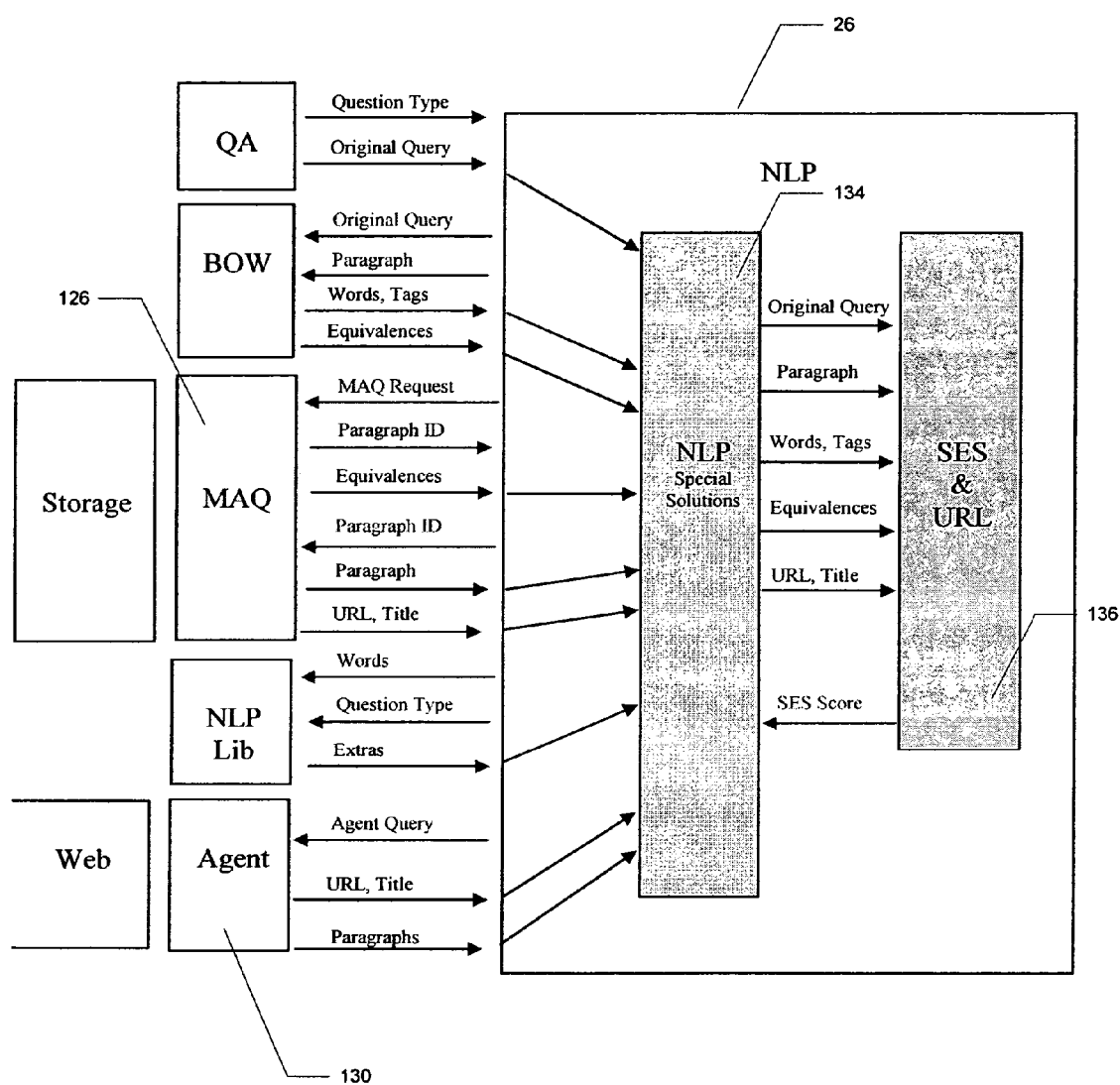
FIG. 3 depicts a system for natural language processing according to one embodiment of the invention.

FIG. 3 depicts a natural language processing module according to one embodiment of the invention. As shown, natural language processing module 26 includes a section for special solutions 134 as well as a scoring section 136. The natural language processing module 26 performs both query analysis as well as paragraph analysis. An agent 130 scours the web and analyzes and retrieves content for the natural language processor to analyze. Agent 130 provides URLs, page titles, and paragraphs to the natural language processor. Once the content is analyzed, the MAQ 126 is used in the storing of paragraph IDs which link to the paragraph URL, and title of the content. When a query is entered, the MAQ is provide with a MAQ request and in response, provides a paragraph ID as well as equivalents as to the NLP for processing and presentation to the user. As discussed above, the bag of words module 24 is provided with the original query or original paragraph and, in turn, provides words, tags, as well as equivalences. The processing done by the NLP module 26 is discussed below with respect to FIG. 4. The MAP system enables ontological semantics analysis both off-line and on-line. It should be noted that the MAQ extracts all possible questions that could be answered from a given web page. The MAQ processing is based on two overriding goals. Given a sentence from a web page, how many questions can be asked so that this sentence will be a potential answer and what are the questions that can be asked which will result in the sentence from the web page being an answer? In a preferred embodiment, all of the questions that can be asked by a user and those that would find answers from analyzed web pages are already prepared by the MAQ algorithm before the user submits a query to the search engine. Once the MAQ files are prepared, they are stored in a file that contains the paragraph ID for easy retrieval. As new web pages are found, the MAQ files are updated.

Figure 4:
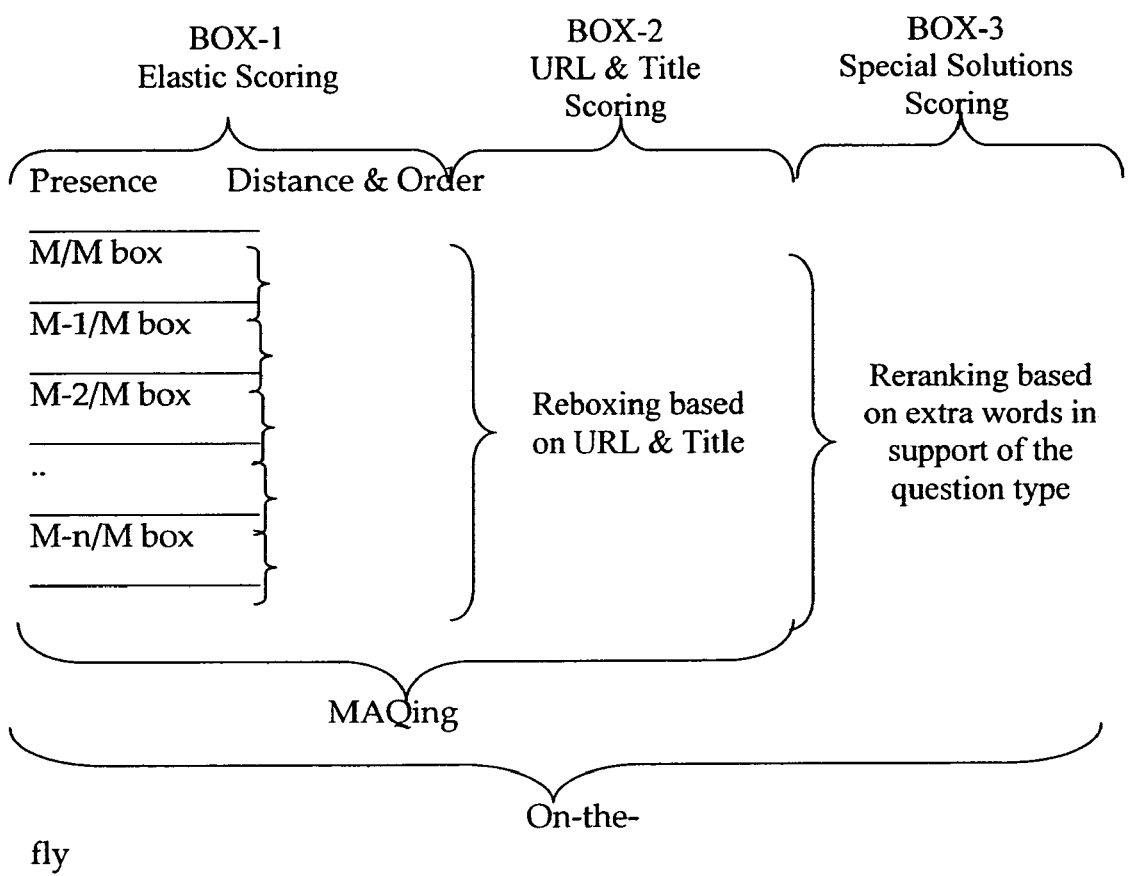
FIG. 4 depicts scoring according to one embodiment of the invention.

NLP is the mechanism to match queries to sentences (paragraphs). It is implemented in a "boxed" manner that is used to determine how the results should be scored. There are 3 "boxing" rounds as shown in FIG. 4.

The first matching round is where elastic scoring is performed. After the paragraphs are scored, in the second round of scoring the paragraph performing URL and title scoring. The final round reranks the paragraphs based on extra words in support of the question type. In the preferred embodiment, the first two rounds are preferably used during MAQ process and on-the-fly scoring, whereas the last round typically applies only to on-the-fly scoring.

TABLE 2

| SES | QT | Table | URL/Title | Extra Words | MAQ |
|---|---|---|---|---|---|
| Sp (pure presence score) | Replacements per question type | | $S_{dom} = Ss\left(\dfrac{J}{Z}\right)^M + c$ | | |
| Sd (distance degradation) | | | $S_{tail} = e\left(Ss\left(\dfrac{J}{Y}\right)^M + c\right)$ | | |
| So (Order degradation) | | | $S_{title} = Ss\left(\dfrac{J}{V}\right)^M$ | | |
| Sx (weighted presence) | Replacements per question type | | | | |
| $Sp = \dfrac{\Sigma_{i=1,M} R_i}{M} \leq 0.1$ $Sx = \dfrac{\Sigma_{i=1,M} R_i W_i}{\Sigma_{i=1,M} W_i} \leq 0.1$ $Sw = \displaystyle\sum_{\substack{i=1,M \\ j=1,M \\ i \neq j}} W_i \cdot W_j + b_{i,j}$ $St = \displaystyle\sum_{\substack{i=1,M \\ j=1,M \\ i \neq j}} \dfrac{M}{\||PS_i - PS_j| - |PQ_i - PQ_j|\| + M} R_{i,j} W_i W_j$ $Ss = Sp\left(1 - \dfrac{(1 - St/Sw)}{k(M)}\right) + 0.001\, Sx$ | | | Ss is assigned a value based on exact match per question type | $Ss_1 = W_{domain} S_{domain} +$ $W_{tail} S_{tail} +$ $W_{title} S_{title} +$ $W_{sentence} Ss$ | Ss Times 1.05 | $Ss1 + 0.01$ |
| Weights are in QANLP Workbench.exe.config | QT tables | Table in MAQ.xml | Weights are in ..exe.config | in ..config | |

In the Box 1, sentence elastic scoring is performed. The sentence score is called a presence score. The elastic score is calculated by adding the weights for each of the question words found in the sentence and dividing by the sum of all the question word weights as shown below.

$$Sx = \frac{\sum_{i=1,M} R_i W_i}{\sum_{i=1,M} W_i} \leq 1.0$$

In the above equation, M is the number of significant words in the query. R is 1 for each query word found in the sentence, and 0 otherwise. The weightless form of the same calculation is:

$$Sp = \frac{\sum_{i=1,M} R_i}{M} \leq 1.0$$

Sx is only used to distinguish the same Sp results (perfect order and distance) by means of a tiny effect.

A distance score for every combination of question word pairs is calculated. This distance score is 1 over the physical distance between the two words in the sentence minus the expected distance. The physical distance is the actual distance of the words between the word pairs Adding the number of question words to the operand and dividend then dilutes the distance score. In this manner this equation gives less importance for longer queries.

$$Sd = \frac{M}{\sum_{i=1,M, j=1,M, i\neq j} ||PS_i - PS_j| - |PQ_i - PQ_j|| + M} \leq 1.0$$

In the above equation, PS is the position of the word in the sentence, PQ is the position of the word in the query, M is the number of words in the query.

Next, an order score is calculated. In the above equation the order score is computed by disregarding all non-query words from the sentence, and focusing on the query words found in the sentence. In this manner extraneous words are eliminated from the calculation.

M=the length of the query;

L=the length of the sentence;

The order score is determined as follows:

Starting from a query word and its neighbor to the right:

R(i)=1 if the query word's neighbor occurs on the right side in the sentence

R(i)=0.5 if the query word's neighbor occurs on the left side in the sentence

R(i)=0.2 if the query word's neighbor occurs on the left side in the sentence and if both words are tagged [PR]s.

$$So = \frac{1}{(M-1)} \sum_{i=1,L} R(i) \leq 1.0$$

where L≧M>1.

An example of the above calculation is shown below.

Consider a query sequence of A B C D E in a sentence E A X X B D X C D X X, where M=5 and L=11. (X represents words that are irrelevant to the query).

R(1)=1.0 (A B–A X X B)

R(2)=1.0 (B C–B D X C)

R(3)=1.0 (C D–C D)

R(4)=0.5 (D E–E A X X B D)

So=(¼)*3.5=0.85

Instead of calculating scores individually, preferably, a pair-wise calculation is performed. $S_w$ is the sum of the multiplication of the weights for each pair. If two words appear next to each other in the query give the weight a little boost b $$Sw = \sum_{\substack{i=1,M \\ j=1,M \\ i \neq j}} W_i \cdot W_j + b_{i,j}$$

Example Query: A B C

Boost=0.1

A weight=0.5

B weight=0.3

C weight=0.2

AB weight=0.15

AC weight=0.10

BC weight=0.06

$S_w$=(0.15+0.1)+0.1+(0.06+0.1)=0.51

The quality of each pairing of words is called Pairwise total score, St, and is given by $$St = \sum_{\substack{i=1,M \\ j=1,M \\ i \neq j}} Sd_{i,j} So_{i,j} Sw_{i,j}$$

Substituting pair wise calculation, we have $$St = \sum_{\substack{i=1,M \\ j=1,M \\ i \neq j}} \frac{M}{||PS_i - PS_j| - |PQ_i - PQ_j|| + M} R_{i,j} W_i W_j$$

The sentence score is $$Ss = Sp\left(1 - \frac{(1 - St/Sw)}{k(M)}\right) + 0.001 Sx$$

This means perfect distance and order will produce:

Ss=Sp+0.001Sx

Anything not perfect will start to degrade Ss=Sp all the way to its certain percentage as determined by the selection of k. For example, k(M)=2 will lower the Ss=Sp all the way to its half value as shown below.

| K(M)  | 2       | 3       | 4       | 5       | 6       |
|-------|---------|---------|---------|---------|---------|
| St/Sw | Ss=     | Ss=     | Ss=     | Ss=     | Ss=     |
| 1     | Sp      | Sp      | Sp      | Sp      | Sp      |
| 0.9   | 0.95 Sp |         |         |         |         |
| 0.8   | 0.90 Sp |         |         |         |         |
| 0.7   | 0.85 Sp |         |         |         |         |
| 0.6   | 0.80 Sp |         |         |         |         |
| 0.5   | 0.75 Sp |         |         |         |         |
| 0.4   | 0.70 Sp |         |         |         |         |
| 0.3   | 0.65 Sp |         |         |         |         |
| 0.2   | 0.60 Sp |         |         |         |         |
| 0.1   | 0.55 Sp |         |         |         |         |
| 0.0   | 0.50 Sp | 0.67 Sp | 0.75 Sp | 0.80 Sp | 0.83 Sp |

Thus k(M), called a boxing coefficient, determines the effect of distance and order on total presence score, and is a function of the length of the query M. Contents of the table above are adjustable via benchmark tests. They all are in between 0 and 1. Default system would use all equal to 1.0.

| M        | 2       | 3         | 4         | 5        | >5         |
|----------|---------|-----------|-----------|----------|------------|
| k        | 2       | 3         | 4         | 5        | 6          |
| Interval | 1/2 = 0.5 | 2/3 = 0.66 | 3/4 = 0.75 | 4/5 = 0.8 | 5/6 = 0.83 |

By doing so, a 3/4 presence will not override a 4/4 presence, even if the order or distance is not good. Different k values can be used to control the overlap.

There are special considerations that should be taken into account. For example, a special case exists when only one query word is found in the sentence, then the pairwise computation as described above can be bypassed by:

Ss=Sp

A sample calculation is shown here.

Query: What is the length of the San Francisco Bridge?

Sentence-1: The length of the entire structure of the San Francisco-Oakland Bay Bridge, with approaches, is 8.4 miles or 7.5 miles. Sources vary due to the start and endpoint of the measurements).

$W_A = 0.5$
$W_B = 1.1$
$W_C = 1.1$
$W_D = 1.1$
Presence:
Sp = 1.0
Degradation by distance and order:

$$St = \sum_{\substack{i=1,M \\ j=1,M \\ i \neq j}} Sd_{i,j}\, So_{i,j}\, Sw_{i,j}$$

| W       | Distance    | Order          |
|---------|-------------|----------------|
| A:B:0.56 | *0.6666667 | *1.0 = 0.3733333 |
| A:C:0.55 | *0.6666667 | *1.0 = 0.3666667 |
| A:D:0.55 | *0.5       | *1.0 = 0.275    |
| B:C:1.22 | *1         | *1.0 = 1.22     |
| B:D:1.21 | *0.6666667 | *1.0 = 0.8066667 |
| C:D:1.22 | *0.6666667 | *1.0 = 0.8133334 |

Sw = 5.31              St = 3.855
Sentence score $$Ss = Sp\left(1 - \frac{(1 - St/Sw)}{k(M)}\right)$$

for k = 2 (method 1)
Ss = 0.8629944
for k(M) = 4 (method 2)
Ss = 0.9314

Query: What is the length of the San Francisco Bridge?

Sentence-2: Before the attacks, the San Francisco Bridge District paid US$500,000.00 a year for $125,000,000.00 worth of coverage, which included terrorist attack.

$W_A = 0.5$
$W_B = 1.1$
$W_C = 1.1$
$W_D = 1.1$
Presence:
Sx = 0.8684
Sp = 0.75
Degradation by distance and order:

$$St = \sum_{\substack{i=1,M \\ j=1,M \\ i \neq j}} Sd_{i,j}\, So_{i,j}\, Sw_{i,j}$$

| W       | D   | O              |
|---------|-----|----------------|
| B:C:1.22 | *1 | *1.0 = 1.22    |
| B:D:1.21 | *1 | *1.0 = 1.21    |
| C:D:1.22 | *1 | *1.0 = 1.22    |

Sw = 3.65              St = 3.65
Sentence score $$Ss = Sp\left(1 - \frac{(1 - St/Sw)}{k(M)}\right)$$

for k = 2 (method 1)
Ss = 0.75
for k(M) = 4 (method 2)
Ss = 0.75

There are two preferably elastic scoring calculations for the text, and the best score among them shall be selected. Scoring calculations are typically performed for a single sentence and a single sentence combined with the next sentence, including the title.

URL & Title Scoring are performed in Box 2 as shown in FIG. 4. First, the system performs URL domain scoring. A URL domain is shown below:

http://www.domain.com/xxx/yyy/zzz

The URL domain score is computed by:

$$S_{dom} = Ss\left(\frac{J}{Z}\right)^M + c$$

where J is the number of characters of the query words found in the domain, and Z is the total number of characters in the domain, and c is the credibility factor. Power to the M (query length) in the equation ensures rapid decay in case of a small mismatch. As M grows, it is desirable to eliminate partial mismatch more rapidly. When J=Z, domain name is always active. Ss is the sentence score where the dissected significant words are treated like a sentence in comparison to the query.

c=0.1 (for .mil .gov)
c=0 (otherwise)
Below is an example of dissecting:
Query: US Army
http://www.USxxxxArmyxxx.com/xxx/yyy/zzz
That means there are 4 words dissected above. It should be noted that the last one is irrelevant.

Next, URL tail scoring is performed. The URL tail is shown below:
http://www.domain.com/xxx/yyy/zzz.ext
The URL tail score is computed by $$S_{tail} = e\left(Ss\left(\frac{J}{Y}\right)^M + c\right)$$

where J is the number of characters of the query words found in the tail, and Y is the total number of characters in the tail, c is the credibility factor, and e is the extension factor. Power to the M (query length) in the equation ensures rapid decay in case of small mismatch. As M grows, it is desirable to eliminate partial mismatch more rapidly. Ss is the sentence score where the dissected significant words are treated like a sentence in comparison to the query.

c=0.1 (for .mil .gov)
c=0 (otherwise)
e=0 (for .exe .gif .jpg)
e=1 (otherwise)

Once the domain and title scoring are complete, title scoring is performed. The title is scored in a manner similar to a sentence. However, the additional factor of rapid decay (in case of long titles where the query words are only a part of the title) is individual.

$$S_{title} = Ss\left(\frac{J}{V}\right)^M$$

In the above equation, J is the number of characters of the query words found in the title, and V is the total number of characters in the title. Power to the M (query length) in the equation ensures rapid decay in the case of small mismatch. As M grows, the system eliminates partial mismatches more rapidly.

Once the Box-1 and Box-2 scores of FIG. 4 are calculated, a Combined Scoring of Box-1 and Box-2 is calculated.

The combined score is calculated by:

$$S_{1,2} = W_{domain}S_{domain} + W_{tail}S_{tail} + W_{title}S_{title} + W_{sentence}Ss$$

The weights above are adjusted based on query techniques such as trial and error, or the like (M is the number of query words). Table 3 is used for fine adjustment of rapid decay if the power rule is not effective.

TABLE 3

| M | $W_{domain}$ | $W_{tail}$ | $W_{title}$ | $W_{sentence}$ |
|---|---|---|---|---|
| 1 | $W_1$ | $W_2$ | $W_3$ | $W_4$ |
| 2 | $W_5$ | $W_6$ | $W_7$ | $W_8$ |
| 3 | $W_9$ | $W_{10}$ | $W_{11}$ | $W_{12}$ |

TABLE 3-continued

| M | $W_{domain}$ | $W_{tail}$ | $W_{title}$ | $W_{sentence}$ |
|---|---|---|---|---|
| 4 | $W_{13}$ | $W_{14}$ | $W_{15}$ | $W_{16}$ |
| 5 | $W_{17}$ | $W_{18}$ | $W_{19}$ | $W_{20}$ |

The sentence also includes the solution scoring shown in Box 3 of FIG. 4. Here, searching is based on words in support of the question type. NLP scoring depends on the question type detection result of the Question Analyzer Module 26. The result possibilities include single word query (non-question, after noise eliminated), double word query (non-question, after noise eliminated), triple word query (non-question, after noise eliminated), multi-word query (non question), what questions, how questions, why questions, who questions, when questions, where questions, confirmation questions, commands, and dialogues.

The list of NLP Methods with respect to the question types are outlined below:

TABLE 4

| | NLP Best Sentence Method |
|---|---|
| Non Question | |
| Single word query | NLP-N1 |
| Double word query | NLP-N2 |
| Triple word query | NLP-N3 |
| Many words query | NLP-N4 |
| What questions | |
| Q1 - What is Y | NLP-N4 |
| Q2 - What is the most [QT]/[V2] Y | NLP-Q2 |
| Q3 - What is the [QT] of Y | NLP-Q3 |
| Q4 - What X is the best Y | NLP-Q4 |
| Q5 - What X [V1] Y | NLP-Q5 |
| Q6 - What [V1] Y | NLP-Q6 |
| Q7 - What X of Y Z | NLP-Q7 |
| Q8 - What [time] Y | NLP-Q8 |
| Q9 - What Y is [QT] for X | NLP-Q9 |
| Q12 - What are the X | NLP-Q12 |
| Q19 - What Y | NLP-N4 |
| How questions | |
| Q20 - How to [V1] Y | NLP-Q20 |
| Q21 - How [QT] do Y | NLP-Q21 |
| Q22 - How much does X [QT] Y | NLP-Q22 |
| Q23 - How much a X [QT] | NLP-Q23 |
| Q24 - How many Y | NLP-Q24 |
| Q25 - How many times Y | NLP-Q25 |
| Q26 - How is the Y | NLP-Q26 |
| Q27 - How is Y | NLP-N4 |
| Q29 - How Y | NLP-N4 |
| Why questions | |
| Q39 - Why Y | NLP-Q39 |
| Who questions | |
| Q41 - Who is the [QT] of Y | NLP-Q41 |
| Q42 - Who [V1] Y | NLP-Q42 |
| Q43 - Who is the [QT] Y | NLP-Q43 |
| Q49 - Who Y | NLP-Q49 |
| When questions | |
| Q59 - When Y | NLP-Q59 |
| Where questions | |
| Q68 - Where can I find X | NLP-Q68 |
| Q69 - Where Y | NLP-Q69 |
| Confirm | |
| Q78 - Is it true X | NLP-N4 |
| Q79 - Is X | NLP-N4 |

TABLE 4-continued

| | NLP Best Sentence Method |
|---|---|
| Commands | |
| C1 - Find Y | NLP-C1 |
| C2 - List Y | NLP-C2 |
| C3 - Compare Y | NLP-C3 |
| Dialogues | |
| DE - whatz up | NLP-DE |
| DR - What is hakia | NLP-DR |

In many instances, users enter only a single word query. In a first embodiment, the top score pattern is read from an external file. The top score pattern is loaded into the system memory. The single word of the query is replaced with X. Exact matches are then found, and the score in the Table NLP-N1.txt is used.

TABLE NLP-N1.TXT

| Pattern found in the sentence (slash/means a new line in the actual table) | Sentence Score |
|---|---|
| X means . . . | 1.0 |
| meaning of X | 1.0 |
| the definition of X | 1.0 |
| the description of X | 1.0 |
| X (is/are/was/were) defined as . . . | 1.0 |
| X (is/are/was/were/has been/have been) known as . . . | 1.0 |
| X (is/are/was/were/has been/have been) referred to as . . . | 1.0 |
| X (is/was/has been) a . . . | 0.9 |
| X (are/were/have been) . . . | 0.9 |
| X (lives/resides) . . . | 0.8 |
| . . . | |
| X | 0.1 (Default) |

An Example is given below:

What is angioplasty?

Answer: According to the Merck manual, angioplasty is defined as a process of replacing . . .

Score=1.0

The double words method is handled, as shown in the table above by NLP-N2. The system reads the top score pattern from an external file and loads it into the memory. Then, the X1 X2 variables are replaced with the double word of the query. Exact matches are fond and the score in the Table NLP-N2.txt is used.

TABLE NLP-N2.TXT

| Pattern found in the sentence | Sentence Score |
|---|---|
| X1 X2 means . . | 1.0 |
| the meaning of X1 X2 (is/are/was/were) | 1.0 |
| the definition of X1 X2 (is/are/was/were) | 1.0 |
| the description of X1 X2 (is/are/was/were) | 1.0 |
| X1 X2 (is/are/was/were) defined as | 1.0 |
| X1 X2 (is/are/was/were/has been/have been) known as | 1.0 |
| X1 X2 (is/are/was/were/has been/have been) referred to as | 1.0 |
| X1 X2 (is/was/has been) a | 0.9 |
| X1 X2 (are/were/have been) | 0.9 |
| X1 X2 (lives/resides) | 0.8 |
| . . . | |
| X1 X2 | 0.5 (Default) |

Triple words queries are handled using NLP-N3. In operation, the top score pattern from an external file is loaded into the memory. The three words replace X1 X2 X3 with the triple word of the query. A matches is found using the score in the Table NLP-N3.txt

TABLE NLP-N3.TXT

| Pattern found in the sentence | Sentence Score | Dialogue Signal |
|---|---|---|
| X1 X2 X3 means . . . | 1.0 | |
| the meaning of X1 X2 X3 (is/are/was/were) | 1.0 | |
| the definition of X1 X2 X3 (is/are/was/were) | 1.0 | |
| the description of X1 X2 X3 (is/are/was/were) | 1.0 | |
| X1 X2 X3 (is/are/was/were) defined as | 1.0 | |
| X1 X2 X3 (is/are/was/were/has been/have been) known as | 1.0 | |
| X1 X2 X3 (is/are/was/were/has been/have been) referred to as | 1.0 | |
| X1 X2 X3 (is/was/has been) a | 0.9 | |
| X1 X2 X3 (are/were/have been) | 0.9 | |
| X1 X2 X3 (lives/resides) | 0.8 | |
| . . . | | |
| X1 X2 X3 | 0.7 (Default) | |

Queries that have more than 3 words are processed using NLP-N4. In operation, the top score pattern is read from an external file and loaded into the memory. The XSEQUENCE in the table is replaced with the words of the query. Exact matches are found and the score in the Table NLP-N4.txt is used. If the exact match is not found, then Elastic Scoring is used. It should be noted that a question in the form of "what is Y?" is handled using NLP-N4.

TABLE NLP-N4.TXT

| Pattern found in the sentence | Sentence Score | Dialogue Signal |
|---|---|---|
| XSEQUENCE means . . . | 1.0 | |
| the meaning of XSEQUENCE(is/are/was/were) | 1.0 | |
| the definition of XSEQUENCE(is/are/was/were) | 1.0 | |
| the description of XSEQUENCE(is/are/was/were) | 1.0 | |
| XSEQUENCE (is/are/was/were) defined as | 1.0 | |
| XSEQUENCE(is/are/was/were/has been/have been) known as | 1.0 | |
| XSEQUENCE(is/are/was/were/has been/have been) referred to as | 1.0 | |
| XSEQUENCE (is/was/has been) a | 1.0 | |
| XSEQUENCE (are/were/have been) | 1.0 | |
| XSEQUENCE (lives/resides) | 1.0 | |
| . . . | | |
| XSEQUENCE | 0.9 (Default) | |

Many queries are received asking a question beginning with what. It should be noted that preferably, [V1]* means V1 and its equivalences. What questions use the NLP-Q2 best question method. The questions are typically in the form "what is the most [QT002]/[V4N5] Y?" For examples: what is the most [expensive] [French wine]? Or What is the most [watched] [TV series]?

These questions are processed using elastic scoring. Elastic Scoring is applied to: most [QT002N4N5]*Y. For example: what is the most [expensive] [French wine]? The query is expanded to become: most {expensive or costly or pricy} French wine. Another example is the query: What is the most [watched] [TV series]? This expanded query becomes most {viewed or Nielsen-rated or admired} TV series. In a preferred embodiment, the equivalences are stored in a file named QT002.txt.

Questions in the form what is the meaning of life are analyzed. These questions use the NLP-Q3. They are analyzed as what is the [QT003] of Y? Another example is what is the length of the San Francisco Bridge?

At the outset, Elastic Scoring is applied to [QT003] of Y and Y [QT003]*. The higher score is selected.

For example, given the query what is the meaning of life? Elastic scoring is applied to the term and its equivalences. The term is 1—meaning of life and the equivalences are 2—life {means or described or defined}. Another example is the query what is the length of the San Francisco Bridge? The first term that is scored is "length of San Francisco Bridge" and the second term that is scored is the expanded phrase "San Francisco Bridge {long or inches or feet}." It should be noted that the equivalences are stored in a file named QT003.txt.

The method called NLP-Q4 is used for questions in the form of what X is the best Y as well as what Y? For example what medicine is the best for headache is input into the system. Elastic Scoring, as discussed above, is used to analyze this query type. Elastic scoring is performed on two different forms of the query, X best Y and best Y X. The higher score for the two different queries is used.

The method called NLP-Q5 is used for queries in the form of what X [V1]Y? An example of such a query is what medicine treats hyperglycemia? Elastic scoring is applied to the query and an expanded form of the query. The two scores result from X[V1]*Y and Y [V1]*[by/with] X. The higher of the two scores is used for matching.

The method called NLP-Q6 is used for queries in the form of what [V1] Y? Queries in this form ask questions such as what makes a good husband? The query is put into the form [V1]*Y and elastic scoring is performed. The generated score is then used for matching.

The method called NLP-Q7 is used for queries in the form of what X of Y Z? Queries in this form ask questions or seek information such as what part of a train ride is fun? The query is put into the form X Y Z and elastic scoring is performed. The generated score is then used for matching.

The method called NLP-Q8 is used for queries in the form of what [time] Y? Queries in this form ask questions or seek information such as what time is the Yankee game on TV? Elastic scoring is performed on Y {starts, calendar, schedule, time, date}. The generated score is then used for matching.

Queries in the form of what Y is the best for X are processed using elastic scoring and the method NLP-Q9. Queries in this form ask questions or seek information such as what medicine is the best for growing hair? Elastic scoring is performed on Y {best} X. The generated score is then used for matching.

The method called NLP-Q10 is used for queries in the form of what should I do Y? Queries in this form ask questions or seek information such as what should I do if my dog eats chocolate? Elastic scoring is performed on Y. The generated score is then used for matching.

The method called NLP-Q12 is used for queries in the form of what (are/were) the X? Queries in this form ask questions or seek information such as what were the suggestions for invading Iraq? Scoring is performed on {list, collection, group, set} X, where the presence of the words in the parentheses contribute to the presence score 1%. The score is then used for matching.

The method called NLP-Q20 is used for queries in the form of how to [V1] Y? Queries in this form ask questions or seek information such as how to cook lasagna? Elastic scoring is performed on {method, way, manner, fashion, style, approach} [V1]*Y, where the presence of the words in the parentheses contribute to the presence score 1. The generated score is then used for matching.

The method called NLP-Q21 is used for queries in the form of how [QT] do Y? Queries in this form ask questions or seek information such as how fast does a BMW go on a dirt road, or how rich is Bill Gates? Elastic scoring is performed on [QT]*Y and Y [QT]*. The higher of the two generated scores is then used for matching.

The method called NLP-Q22 is used for queries in the form of how much does X [QT] Y? Queries in this form ask questions or seek information such as how much does a sumo wrestler weigh minimum? Elastic scoring is performed on X [QT]*Y. The generated score is then used for matching.

The method called NLP-Q23 is used for queries in the form of how much a X [QT]? Queries in this form ask questions or seek information such as how much does a BMW cost? Elastic scoring is performed on X [QT]* and [QT]* of X. For example, the system seeks answers to the initial question in the form of "BMW costs $40,000" and Price of BMW is $40,000. The higher of the two generated scores is then used for matching.

The method called NLP-Q20 is used for queries in the form of how many Y? Queries in this form ask questions or seek information such as how many players are in a soccer team? Elastic scoring is performed {number, quantity, population, one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, hundred, thousand, million, billion, trillion} Y, where the presence of the words in { } contribute to the presence score 1% (multiplier of 1.01). The generated score is then used for matching.

The method called NLP-Q25 is used for queries in the form of how many times Y? Queries in this form ask questions or seek information such as how many times [did Chicago win the NBA title]? Elastic scoring is performed Y {frequency, repetition, times, seldom, often, frequent, once, twice}, where the presence of the words in { } contribute to the presence score 1% (multiplier of 1.01). The generated score is then used for matching.

The method called NLP-Q26 is used for queries in the form of how is the Y? Queries in this form ask questions or seek information such as how is the weather in London, how are the markets in Tokyo, or how is the situation in Iraq? Elastic scoring is performed. The generated score is then used for matching.

The method called NLP-Q39 is used for queries in the form of why Y? Queries in this form ask questions or seek information such as why is the sky blue? Elastic scoring is performed on {reason} Y and Y {reason, result, result-of, due, due-to, caused, because, understand, understanding}, where the presence of the words in { } contribute to the presence score 1% (multiplier of 1.01). The higher generated score is then used for matching.

The method called NLP-Q41 is used for queries in the form of who is the [QT] of Y? Queries in this form ask questions or seek information such as who is the king of comedy or who is the CEO of IBM. Elastic scoring is performed on [QT]-of Y and Y's [QT]. The higher generated score is then used for matching.

The method called NLP-Q42 is used for queries in the form of who [V1] Y? Queries in this form ask questions or seek information such as who killed Kennedy? Elastic scoring is performed on [V1]*Y. The generated score is then used for matching.

The method called NLP-Q43 is used for queries in the form of who is the [QT] Y? Queries in this form ask questions or seek information such as who is the best chef in New York? Elastic scoring is performed on [QT]*Y. The generated score is then used for matching.

The method called NLP-Q49 is used for queries in the form of who Y? Queries in this form ask questions or seek information such as who is Madonna? Elastic scoring is performed on Y. The generated score is then used for matching.

The method called NLP-Q59 is used for queries in the form of when Y? Queries in this form ask questions or seek information such as when did the Crusades start? Elastic scoring is performed on {date, a.c., b.c., era, time, history, century, decade, year}Y and Y {Monday, Tuesday, Wednesday, Thursday, Friday, Saturday, Sunday, January, February, March, April, May, June, July, August, September, October, November, December}, where the presence of the words in { } contribute to the presence score 1% (multiplier of 1.01). The higher generated score is then used for matching.

The method called NLP-Q68 is used for queries in the form of where can I find Y? Queries in this form ask questions or seek information such as where can I find wall mounted hair dryer? Elastic scoring is performed on Y {address, located, place}, where the presence of the words in { } contribute to the presence score 1% (multiplier of 1.01). The generated score is then used for matching.

The method called NLP-Q69 is used for queries in the form of where Y? Queries in this form ask questions or seek information such as where did the Crusades start? Elastic scoring is performed on {location, address} Y and Y {address, located, placed, territory}, where the presence of the words in { } contribute to the presence score 1% (multiplier of 1.01). The higher generated score is then used for matching.

The method called NLP-Q78 is used for queries in the form of how? Queries in this form ask questions or seek information such as how? Elastic scoring is performed. The generated score is then used for matching.

The selection among the best sentences for dialogue response is done according to the following rules; Rule-1: The best sentence score contains Sp=1, Rule-2: The sentence ends with a period, Rule-3: The sentence length is preferably between 3 words minimum and 15 words maximum, Rule-4: The sentence includes at least one word with Noise tags, Rule-5: The words in the sentence should not have all [SM] or [PR] tags, Rule-6: The words in the sentence preferably have at least have one of the [SM], [PR], [α] tags, and Rule-7: If no sentence qualifies there is no dialogue response.

The Bag of Words object (BOW) takes a sentence, identifies the role of every word, then assigns tags to each word. This object also identifies natural sequences, denoted by S{x}, and proper name sequences, denoted by PNS{x}. This object also checks the Proper Name list, and adds a new proper name if it is not in the list already.

For a given language, English for example, the following tags are defined. It should be noted that other tags may be implemented for other grammatical parts of speech as well.

[V1]—Verb in any form;
[V2]—Verb in simple tense;
[V3]—Verb in simple present form $3^{rd}$ person;
[V4]—Verb in past tense;
[V5]—Verb in past participle tense;
[V6]—Verb in gerund form;
[A1]—Sole adjective/modifier;
[T1]—Time word of any kind;
[T2]—Time duration word;
[T3]—Time calendar word;
[P1]—Place word of any kind;
[P2]—Place word Countries;
[P3]—Place word Cities;
[PR]—Proper name;
[Z1]—Noise words;
[SM]—Noun undetected;
[N1]—Noun of the most common type;
[Q1]—Question word;
[H1]—Pronoun;
[#1]—Number word of quantity;
[C1]—Category: Currency of any kind (symbol+number) or (word);
[M1]—Category: Measurement of any kind (number+symbol) or (number+word);
[K1]—Symbols $, #, %, &;
[D1]—Adverbs ending with -ly with exceptions (fly, Elly, belly, etc.);
S{x}—A sequence that may include two or more Tags; and
PNS{x}—A proper name sequence that may include two or more Tags
token tag—is a single character that precedes the Tags can be anything.

In a preferred embodiment, lists reside in the system memory. The list conventions include RE-Verbs.txt Detect [V1][V2][V3][V4][V5][V6]

All verbs in English arranged as 5 entries per line and each line shows equivalency.

| V1 | V2 | V3 | V4 | V5 |
|---|---|---|---|---|
| simple | $3^{rd}$ | past | part | gerund |
| go | goes | went | gone | going |
| sleep | sleeps | slept | slept | sleeping |

RE-Modifiers.txt Detect [A1]
List of sole adjectives and modifiers, one entry per line.
RE-Timewords.txt Detect [T1][T2] [T3]
List of place words, two columns

| T2 | T3 |
|---|---|
| Duration | Calendar |
| while | Monday |
| during | Tuesday |
| meanwhile | Wednesday |
| forever | Thursday |
| ever | Friday |

RE-Placewords.txt Detect [P1] [P2] [P3]
List of time words, two columns

| P2 | P3 | P4 | P5 | P6 |
|---|---|---|---|---|
| Countries | Cities | Abbreviations | State Codes | States |
| France | Rome | Ave | TX | Nebraska |
| Italy | Jakarta | Str | NY | Wyoming |

RE-CatXX.txtDetect [xx]
List of Category XX words. There may be several of these files depending on the number of categories authorized.
RE-Noisewords.txt Detect [Z1]
List of noise words.
RE-Nounwords.txt Detect [Z2]
List of common nouns words.
RE-Questionwords.txt Detect [Q1]
List of question words.
RE-Pronouns.txt Detect [H1]

List of noise words.
RE-Numberwords.txt Detect [#1]
List of number words.
RE-Currencywords.txt Detect [C1]
List of currency words.
RE-Measurementwords.txt Detect [M1]
List of noise words.
RE-Adverbs.txt Detect [D1]
List of adverbs.
RE-Proper.txt Detect [PR]
List of proper names.
RE-Continue.txt
List of character(s) that follow a period immediately, which suggests the period is not the end of a sentence. Single entry per line.
RE-Stop.txt
List of character(s) that terminate a PNS or S like comma, ( ) { } [ ] " |
RE-EndofSentence.txt
List of character(s) that terminate a sentence like period, colon, semicolon, question mark, exclamation mark Using the lists each word in the sentence must be tagged (i.e., [X]). The order of the Tag tests i.e., whether the word belongs to one of the lists, is important because the same word can belong to more than one Tag definition, and the conflicts must be resolved. Thus, it is preferable to perform tagging in the following order Identify all tags except [Vx]
Identify [Vx] as the last step of identification
Tag the remaining as [SM]
Identify [PR], and PNS forms Note that the latter Tags override the former Tags above. It should be noted that other orders can be used for Tagging and tags may not override other Tags in other embodiments.

All tags except [Vx] are identified using their respective resource lists via word-by-word comparison. These identifications do not care if the words are capitalized or not. While most word are tagged as a single word comparison, some tags involve two or three tags, and create a sequence. The tags that require multiple tags are currency tags, time word tags, and place word tags.

Currency representations are shown below

| $6 MM | [C1] [K1] |
| $6 million | [C1] [#1] |
| 6 million Dollars | [#1] [#1] [C1] |
| $6 MM Canadian Dollars | [C1] [K1] [xx] [C1] |
| $6,000,000 USD | [C1] [K1] |

These types of sequences are not broken in cluster computations.
Therefore,
IF {a word with a [C1] tag is adjacent to any combination of [#1][K1]}
THEN the entire combination is marked as a sequence, such as S{[C1][#1][K1]}
Time/date representations are shown below.

| Mar. 24, 2004 | [T1] [#1] comma [#1] |
| 24 Mar. 2004 | [#1] [T1] [#1] |
| Friday, June 8 | [T1] comma [T1] [#1] |
| During the month of March | [T1] [Z1] [T1] [Z1] [T1] |

These types of sequences are not broken in cluster computations. Therefore,
IF {a word with a [T1] tag is adjacent to any combination of [T1][#1][Z1]}
THEN the entire combination is marked as a sequence, such as S{[T1][#1][T1]}
Address representations are shown below.

| 5 Worth Str., Apt 5G | [#1] [P1] [P4] [P4] [#3] |
| Nebraska, NB 10034 | [P6] [P5] [#1] |

Typical P4 words
Apt. Str. Ln. Lane Ave. Avenue Blvd. Fl, Floor,
Typical P5 words (States)
NY, TX, AL, GA
Typical [#3]
Combination of a number and letter, such as 5G, 4F, 20-A, etc.

These types of sequences must not be broken in cluster computations. Therefore:
IF {a word with a [Px] tag is adjacent to any combination of [#1] [#2] [#3]}
THEN the entire combination is marked as a sequence, such as S{[P1][#1]}

The system identifies all of the [V1] tags. This ensures that some of the dual words identified as nouns in the previous steps are converted to action tags as their last accepted form. All V2, V3, V4, V5 are marked as V1 tag in QI. Any left over words from the steps above are to tagged as [SM] indicating that they are "something" and shall be treated as nouns.

After the identifications above, each capitalized word in the sentence (capitalized letter(s) in any position in the word) are considered as a proper name and are assigned a new tag as [PR] depending on the conditions. The old tag is preserved in case the new tag proves invalid. Capitalized words may include:

| a name such as "Michael" | [SM] => [PR] |
| a noise word such as "The" | [Z1] => [PR] |
| a noun such as "Soldier" | [N1] => [PR] |
| place word such as "Paris" | [P1] => [PR] |
| time word such as "Friday" | [T1] => [PR] |
| a company name such as "imClone" | [SM] => [PR] |
| an acronym such as "USA" | [P1] => [PR] |
| a file name such as "My_File." | [SM] => [PR] |
| a currency name such as "Dollars" | [C1] => [PR] |
| a measurement name such as "Pounds" | [M1] => [PR] |

Capitals also indicate beginning-of-the-sentence words. Conflicts are resolved by the rules below. Each rule can be overridden by the next rule, thus, in this embodiment, the order of execution is important.

| If the first word | AND | THEN |
| In the Proper name list | | [PR] |
| [V1] | Next word capitalized (or after a noise word) | [PR] |
| [N1] | Next word capitalized (or after a noise word) | [PR] |
| [SM] | Next word capitalized (or after a noise word) | [PR] |

OTHERWISE retain its previous tag

A proper name sequence (PNS) means there is more than one word with [Pr] tag in the vicinity of another one. There are two types of PNSs Proper names appearing together (United States), and proper names that have certain noise words in between (Army of the United States). In a preferred embodiment, the QI algorithm will MARK the PNSs using the following rules:

IF {several words with [PR] tags are lined up next to each other separated only by space}
THEN all these words with [PR] tag are a PNS
and denoted as PNS{[PR] [PR] . . . [PR]}
Example:

| United States | PNS{ [PR] [PR] } |
| Justice Department | PNS{ [PR] [PR] } |

IF {several words with [PR] tags are lined up next to each other separated by [Z1] noise words}
THEN all these words with [PR] and [Z1] tags are a PNS
and denoted as PNS{[PR] [Z1] . . . [PR]}
Example:

| Department of Justice | PNS{ [PR] [Z1] [PR] } |
| Raiders of the Lost Ark | PNS{ [PR] [Z1] [Z1] [PR] [PR] } |
| Avalanche in Tibet | PNS{ [PR] [Z1] [PR] } |

Morphological variations are handled by the Morphology Object. Morphology includes verb morphology, and morphology using word ending letter, word endings, and suffixes.

Verb Morphology is handled via a master verb file where present, past, particle, and gerund forms of each verb is listed. Alternatively, the rules below can also be used. This object must also have a stemming function (backward operation).

Morphology depends upon word endings. In other words, a word ending will define how the word is modified. Table 4.2 shows sample words sorted by word ending.

4.2 Word Endings
A papaya, banana, aroma, corona, algebra
B cob, tab, mob, rob
C lilac
D add, pad, sad, said, paid, read, weed, seed, greed
E line, lime, wine, whine, mine, mile, stone, trouble, gone, flue, postpone, torture, coerce, toe, continue, flexible, able, laxative, communicate, fabricate, converse, commune, converge, employee, hibernate, nominate
F cuf
G egg
H which, twitch, switch, bitch, hitch, french
I alibi, gemini,
J
K back, attack, hack, black, lack, truck, trunk, crank, flank
L hotel, april, minimal, optimal, respectful, brutal, full, fail, fulfill, kill, hill, bill, will
M Amsterdam, dam, phlegm, swim
N can, man, ban, fan, tan, dawn, down, thin
O phyllo, potato, tomato
P cap, tap, lap, map, top, tap
Q
R tar, far, tear, fear, mirror, car
S fuss, bus, yes, capricious, continuous, laziness, logistics, pass, mass,
T moment, dirt, most, east, west, internet, cut, affect, effect, infect, diligent. intelligent
U you, flu, thou,
V
W saw, raw, meow, how, new
Y they, hay, happy, lay, lazy, story, enemy, day, pay, lazy, tardy, hungry*
Z buzz Utilizing the word ending, as shown in Table 4.2, endings are added to words. Standard grammatical rules of construction apply. Several examples are given below.
Adding the ing Suffix:
Ending letter -e
remove -e add ing
ending -ne
remove -ne add ning
ending -f, -m, -n, -p, -r, -s, -t
add—fing, -ming, ning, ping, ring, sing, ting
Adding the ment/mant suffix:
end -m
add -ent only
end -e
remove -e, add ment
Adding ness to Words:
end -y
remove y, add -iness
Adding less to Words:
end -y
remove y, add -less
remove y, add -iless
Adding tion/ion/sion/ation to Words:
end -e
remove -e, add -sion, tion, ation
Typically, any one of the following suffixes can be added to a word to enlarge the scope of the search.
ing—verb
ment—verb
mant—verb
ness—adj
less—adj
tion—verb
ion—verb
tions—verb
ions—verb
ist—noun?
ism—verb/noun/adj
sm—verb/noun/adj
ed—verb
d—verb
s—noun/verb
es—noun/verb
ies—noun/verb
ous—adj
ously
ly—adj
y—adj
ence
st—adj
est—adj
er—adj
r—adj
or—adj/noun
ee—verb
ive—verb/noun
ve—verb/noun ize
ic/tic/fic
al/ual/ial The present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

In the specification, the term "media" means any medium that can record data therein. The term "media" includes, for instance, a disk shaped media for such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

A recording media storing a program for accomplishing the above mentioned apparatus maybe accomplished by programming functions of the above mentioned apparatuses with a programming language readable by a computer or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device, any suitable device for performing computations in accordance with a computer program may be used. Examples of such devices include a personal computer, a laptop computer, a microprocessor, a programmable logic device, or an application specific integrated circuit.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A method performed on a computer for data searching, comprising:
   collecting data utilizing a computer network;
   parsing the data by language type;
   expanding the data using off-line ontological semantics;
   categorizing the data and expanded data by anticipated queries;
   a processor scoring the data and the expanded data based on anticipated queries;
   receiving a query;
   parsing the query for question type and expanding the query using ontological semantics and;
   comparing the parsed and expanded user query with the anticipated queries; and
   providing the matching data and the expanded data based in part on the comparison by adding a weight for each word and dividing by a total number of words, wherein the scoring is calculated such that $$Sx = \frac{\sum_{i=1,M} R_i W_i}{\sum_{i=1,M} W_i} \leq 1.0$$

wherein M is a number of significant words in the data, R is 1 for each word found in the data, and 0 otherwise, W is the weight for each word and $S_x$ is a presence score;
   storing the data and the expanded data based on anticipated queries;
   receiving a query;
   parsing the query for question type and expanding the query using ontological semantics;
   the processor comparing the parsed and expanded user query with the anticipated queries; and
   providing the matching data and the expanded data based in part on the comparison.

2. A method performed on a computer for data searching, comprising:
   collecting data utilizing a computer network;
   parsing the data by language type;
   expanding the data using off-line ontological semantics;
   categorizing the data and expanded data by anticipated queries;
   scoring the data based on the parsed data;
   a processor scoring the data based on a universal resource locator and title of the data, wherein the universal resource locator scoring is calculated such that:

$$S_{dom} = Ss\left(\frac{J}{Z}\right)^M + c$$

wherein J is a number of characters of query words found in a domain in the universal resource locator, Z is a total number of characters in the domain, M is a length of the query, c is a credibility factor, $S_s$ is a sentence score and $S_{dom}$ is the universal resource locator scoring;
   scoring the data based on the query;
   storing the data and the expanded data based on anticipated queries;
   receiving a query;
   parsing the query for question type and expanding the query using ontological semantics;
   the processor comparing the parsed and expanded user query with the anticipated queries; and
   providing the matching data and the expanded data based in part on the comparison.

3. A method performed on a computer for data searching, comprising:
   collecting data utilizing a computer network;
   parsing the data by language type;
   expanding the data using off-line ontological semantics;
   categorizing the data and expanded data by anticipated queries;
   scoring the data based on the parsed data;
   scoring the data based on a universal resource locator and title of the data;
   a processor scoring the data based on the query, wherein the score is degraded by distance between data words and an order of the data words such that:

$$St = \sum_{\substack{i=1,M \\ j=1,M \\ i \neq j}} Sd_{i,j} So_{i,j} Sw_{i,j}$$

wherein M is a length of the query, $S_d$ is a pairwise distance, $S_o$ is a pairwise order score, $S_w$ is a pairwise weighting score, and $S_t$ is a pairwise total score;
   storing the data and the expanded data based on anticipated queries;
   receiving a query;
   parsing the query for question type and expanding the query using ontological semantics;
   the processor comparing the parsed and expanded user query with the anticipated queries; and
   providing the matching data and the expanded data based in part on the comparison.

* * * * *